(12) United States Patent
Nakajima et al.

(10) Patent No.: US 8,339,074 B2
(45) Date of Patent: Dec. 25, 2012

(54) POWER CONVERTER CONTROL APPARATUS

(75) Inventors: Kenji Nakajima, Chiyoda-ku (JP); Masato Mori, Chiyoda-ku (JP); Kenichi Akita, Chiyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 422 days.

(21) Appl. No.: 12/816,792

(22) Filed: Jun. 16, 2010

(65) Prior Publication Data
US 2011/0193504 A1 Aug. 11, 2011

(30) Foreign Application Priority Data

Feb. 8, 2010 (JP) ................................. 2010-025661

(51) Int. Cl.
*H02P 1/00* (2006.01)
(52) U.S. Cl. ......................... 318/139; 318/801; 318/727
(58) Field of Classification Search .................. 318/139, 318/801, 727, 611, 146, 434; 322/19, 24; 180/443
See application file for complete search history.

(56) References Cited

U.S. PATENT DOCUMENTS
2002/0026267 A1* 2/2002 Kifuku ............................ 701/41

FOREIGN PATENT DOCUMENTS
| JP | 2003-284257 A | 10/2003 |
| JP | 2007-300750 A | 11/2007 |
| JP | 2009-303356 A | 12/2009 |
| JP | 2010-81709 A | 4/2010 |

* cited by examiner

*Primary Examiner* — Karen Masih
(74) *Attorney, Agent, or Firm* — Sughrue Mion, PLLC

(57) ABSTRACT

Generation voltage control or generation torque control is performed as suitable control based on an external command or a load of a generator motor, to thereby prevent a rapid change of a generation torque or excessive power generation. A power converter control apparatus includes: a power conversion unit including a bridge circuit for controlling energization of an armature winding and a field circuit for controlling energization of a field winding; and a control device including B-terminal voltage detection means, field current detection means, generation voltage control means, generation torque control means, and control selection means. The control selection means selects the one of the generation voltage control means and the generation torque control means based on one of a command from an outside and a load of the generator motor.

5 Claims, 11 Drawing Sheets

POWER CONVERTER CONTROL APPARATUS

BACKGROUND OF THE INVENTION

1. Field of the Invention

The present invention relates to a power converter control apparatus, which is mounted on mainly a vehicle and is connected to a field winding type rotating generator motor, which operates as a motor at the start of an engine, operates as a generator after the start, and has an armature winding and a field winding.

2. Description of the Related Art

In recent years, for environmental protection and improvement of fuel efficiency, so-called hybrid vehicles including an engine and another power source such as a rotating generator motor have been increasingly developed and put to a practical use. Such vehicles alternatively use the engine or the another power source based on running states.

For example, there is a technique called an idling stop. In order to suppress unnecessary fuel consumption during idling, when a vehicle stops at a traffic light, an internal combustion engine is stopped. When the intention of starting of an operator, such as stepping on the accelerator or brake release is detected, the internal combustion engine is restarted by the rotating generator motor.

The rotating generator motor mounted on such vehicle is mounted on the engine so as to give and receive a torque, and hence an rpm may significantly change by the operator's operation of the accelerator or by the influence of friction of the engine. Therefore, a field winding type, which may be controlled with a field current without embedding a permanent magnet in a rotor, is employed as a type capable of controlling an induced voltage of a rotating generator motor regardless of the rpm of the engine.

When the rotating generator motor mounted on the vehicle is used as a generator, a generation torque corresponding to a power generation amount is generated in the coupled engine. When the rpm is constant, the generation torque increases as the power generation amount becomes larger. Therefore, when the power generation amount is rapidly increased, the generation torque to be generated also rapidly increases. If the acute change of the generation torque occurs during, for example, idling, there may cause an engine stall. Thus, in order to prevent the engine stall during the generation of power, it is necessary to grasp a generation torque amount generated for the engine.

Therefore, for example, JP 421370 B describes that, in order to grasp a load torque during the generation of power, the load torque during the generation of power is estimated based on an rpm of a generator for vehicle, a field current, a battery voltage, and the like.

In general, the generator mounted on the vehicle performs generation voltage control so as to adjust a voltage of a power supply electrically connected to the generator to a predetermined value. However, in this case, if the voltage of the power supply is rapidly changed for some reason, the power generation amount rapidly changes. As a result, the generation torque rapidly changes. If a rapid increase in power generation amount, namely, a rapid increase in generation torque occurs in a state in which an engine output is low, such as an idling state, the engine stall causes. Therefore, it is necessary to estimate the generation torque for the engine during the generation of power and to control the estimated value of the generation torque to a predetermined value. However, there is not a specific condition for the choice between generation voltage control and generation torque control, and hence which control is to be used is a problem.

SUMMARY OF THE INVENTION

The present invention has been made to solve the problems described above. An object of the present invention is to suppress a variation in generation torque and to prevent excessive power generation in a power converter control apparatus used for a field winding type generator motor having a field winding by switching between generation voltage control and generation torque control based on a command from an outside or a load of the generator motor.

According to the present invention, a power converter control apparatus connected to a multiphase alternating current generator motor including an armature winding and a field winding, includes: a power conversion unit; and a control device for controlling on/off of switching elements of the power conversion unit, in which the power conversion unit includes a bridge circuit including a switching element for a positive side arm and a switching element for a negative side arm, for controlling energization of the armature winding and a field circuit for controlling energization of the field winding using a field switching element, the control device includes B-terminal voltage detection means for detecting a B-terminal voltage generated between a reference potential and a B-terminal which is a power input and output terminal of the multiphase alternating current generator motor, field current detection means for detecting a field current flowing through the field winding, generation voltage control means for controlling the field current so that the B-terminal voltage in the multiphase alternating current generator motor becomes equal to a generation voltage command, generation torque control means for controlling the field current so that a generation torque in the multiphase alternating current generator motor becomes equal to a generation torque command, and control selection means for choosing one of the generation voltage control means and the generation torque control means during generation of power, and the control selection means selects the one of the generation voltage control means and the generation torque control means based on one of a command from an outside and a load of the multiphase alternating current generator motor.

According to the present invention, the generation voltage control or the generation torque control is performed as suitable control based on the external command or the load of the generator motor, and hence a rapid change of the generation torque or excessive power generation may be prevented and the switching between the generation voltage control and the generation torque control may be smoothly performed to prevent variations in generation voltage and generation torque.

DETAILED DESCRIPTION OF THE PREFERRED EMBODIMENTS

Embodiment 1.

Figure 1:
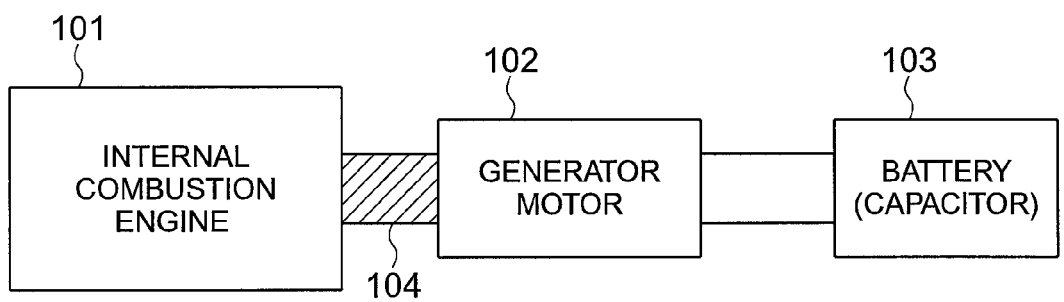
FIG. 1 is an entire explanatory diagram illustrating a vehicle system in which a field winding type generator motor is mounted as a rotating electrical machine on a vehicle.
Figure 2:
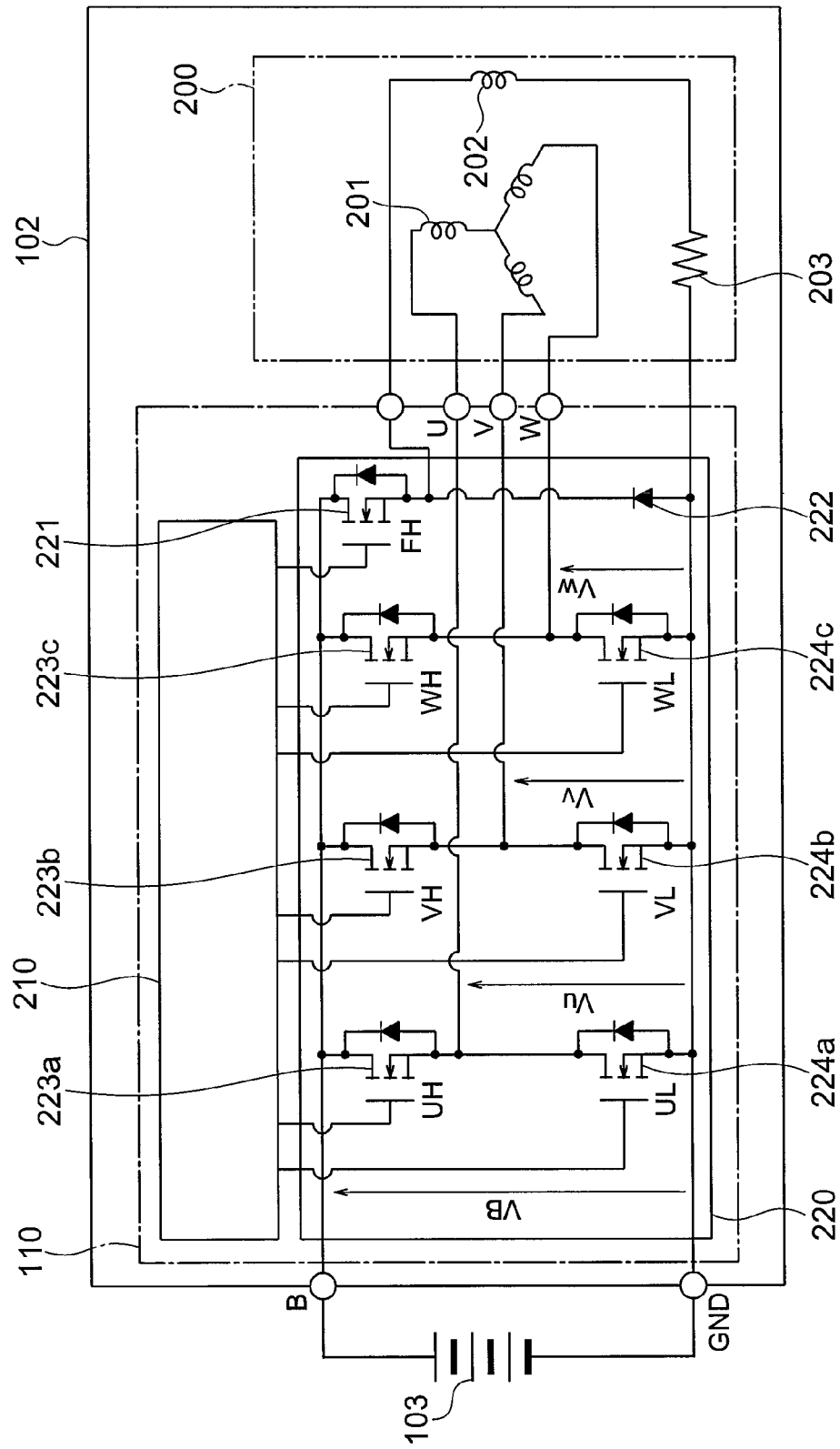
FIG. 2 is a structural diagram illustrating a generator motor including a power converter control apparatus for vehicle according to Embodiment 1 of the present invention.
Figure 3:
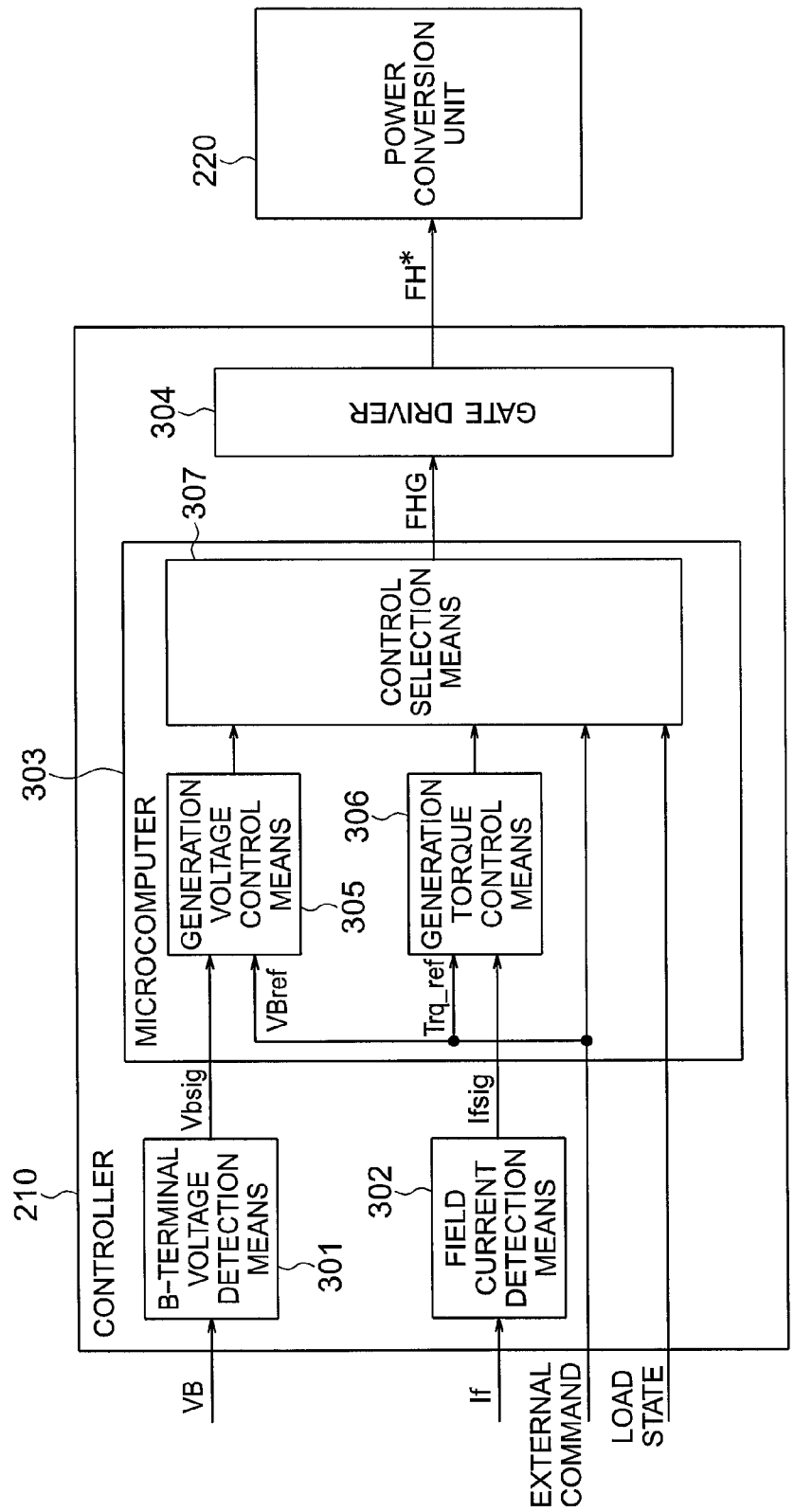
FIG. 3 is a block diagram illustrating a structure of the power converter control apparatus according to Embodiment 1 of the present invention.

Hereinafter, a power converter control apparatus according to Embodiment 1 of the present invention is described in detail with reference to the attached drawings. FIG. 1 is an entire explanatory diagram illustrating a vehicle system in which a field winding type generator motor is mounted as a rotating electrical machine on a vehicle. FIG. 2 is a structural diagram illustrating a generator motor including a power converter control apparatus for vehicle according to Embodiment 1 of the present invention. FIG. 3 is a block diagram illustrating a structure of the power converter control apparatus according to Embodiment 1 of the present invention.

In FIG. 1, an internal combustion engine 101 is connected to a generator motor 102 through a power transmission means 104 such as a belt. During the operation of the internal combustion engine 101, a battery (or capacitor) 103 stores electrical energy obtained by AC-DC conversion by the motor generator 102.

In FIG. 2, the generator motor 102 includes a power converter 110 and a motor generator unit 200. The power converter 110 includes a power conversion unit 220 and a controller 210 for controlling the turning on and off of switching elements.

The power conversion unit 220 includes a field switching element 221 for PWM-controlling a field current flowing through a field winding 202, a free wheel diode 222 connected in series to the switching element 221, three-phase upper-arm switching elements 223a, 223b, and 223c each including a parasitic diode, and three-phase lower-arm switching elements 224a, 224b, and 224c each including a parasitic diode. The three-phase upper-arm switching elements 223a, 223b, and 223c are connected to a B-terminal for a plus power supply input from the battery 103 and to respective U-, V-, and W-phase terminals of three-phase windings 201 of the motor generator unit 200. The three-phase lower-arm switching elements 224a, 224b, and 224c are connected to a GND-terminal for an earth input from the battery 103 and to the respective U-, V-, and W-phase terminals of three-phase windings 201.

In FIG. 2, the motor generator unit 200 is a three-phase field winding type generator motor including the three-phase windings 201 and the field winding 202. However, a winding type or the number of phases may be changed. The generator motor 102 is an integral structure type generator motor integrally including the power converter 110 and the motor generator unit 200. However, a separation structure type generator motor device in which the power converter 110 and the motor generator unit 200 are physically separated from each other may be used.

Next, an internal structure of the controller 210 is described with reference to FIG. 3. The controller 210 includes a B-terminal voltage detection means 301, a field current detection means 302, a microcomputer 303, and a gate driver 304. The microcomputer 303 includes a generation voltage control means 305, a generation torque control means 306, and a control selection means 307. The controller 210 and the microcomputer 303 have various functions for vehicle power converter except the functions illustrated in FIG. 3, but only sections related to the present invention are described here.

The B-terminal voltage detection means 301 detects a voltage VB of a positive side terminal (B-terminal voltage) relative to a potential of a negative side terminal GND of the power conversion unit 220, converts the voltage into an AD input range of the microcomputer, and outputs a converted voltage to the microcomputer 303. The field current detection means 302 detects a current If flowing through the field winding 202 by a current sensor 203, converts a voltage value corresponding to a sensor value into an AD input range of the microcomputer, and outputs a converted voltage to the microcomputer 303.

The gate driver 304 operates the gates of the switching elements 221, 223a to 223c, and 224a to 224c of the power conversion unit 220 based on a gate signal determined by the microcomputer 303 to perform switching.

During the generation of power, the microcomputer 303 controls the supply of the field current based on the operation of the generator motor 102 to output a desired generation voltage or generation torque. For example, in a mode for controlling the generation voltage of the generator motor 102, the voltage VB of the B-terminal (B-terminal voltage) which is the input and output terminal is controlled to become a generation voltage command. Therefore, the generation voltage control means 305 performs voltage feedback control based on a generation voltage command VBref and a B-terminal voltage Vbsig, and calculates an on-time (or DUTY value) to output a PWM signal. The gate driver 304 controls the turning on and off of the switching element 221 based on the PWM signal to supply the field current. Thus, the generation voltage is controlled to follow the generation voltage command VBref.

In a mode for controlling the generation torque of the generator motor 102, the field current is supplied such that the generation torque becomes a generation torque command. Therefore, the generation torque control means 306 performs current feedback control based on a field current command corresponding to a generation torque command Trq_ref and a field current Ifsig, calculates a voltage to be applied to a field coil, and calculates an on-time (or DUTY value) based on the applied voltage and the B-terminal voltage to output a PWM signal. The gate driver 304 controls the turning on and off of the switching element 221 based on the PWM signal to supply the field current. Thus, the generation torque is controlled to follow the generation torque command Trq_ref.

As described above, the microcomputer 303 may perform control such that the generation voltage or the generation torque is set to a desired value by the generation voltage control means 305 or the generation torque control means 306. Therefore, other known technologies may also be used.

Figure 4:
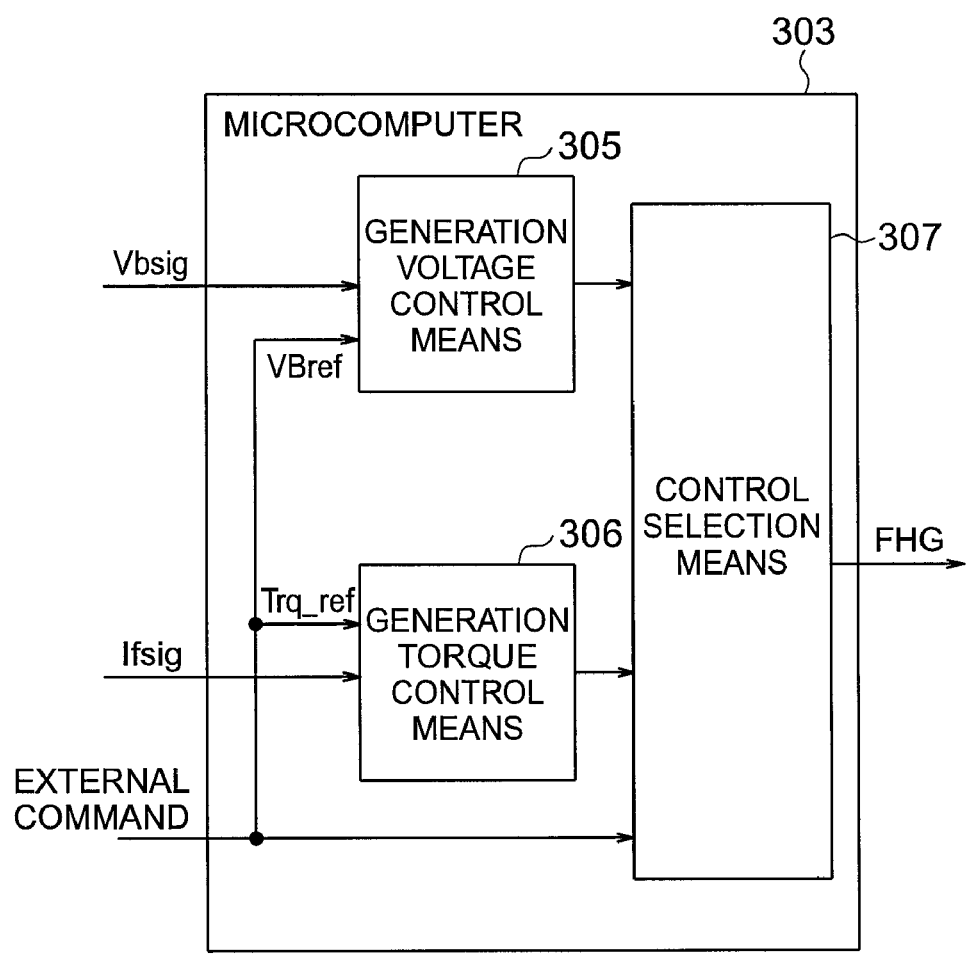
FIG. 4 is a diagram illustrating a microcomputer control structure in Embodiment 1 of the present invention.

As illustrated in FIG. 4, the control selection means 307 selects any one of the output of the generation voltage control means 305 and the output of the generation torque control means 306. When the release of a driving command for the generator motor 102, a generation voltage control command, or a generation torque control command is input from another control unit, or when a generation load of the generator motor changes, the control selection means 307 selects the output of the generation voltage control means 305 or the output of the generation torque control means 306.

For example, in the power generation operation after the release of the driving command for the generator motor 102, the output of the generation torque control means 306 is selected by the control selection means 307. After the driving of the generator motor 102, energy stored in the battery 103 connected to the generator motor 102 is consumed because of the driving, and hence a terminal voltage of the battery 103 reduces. Therefore, when the generation voltage is controlled during the power generation operation immediately after the driving, a deviation of the B-terminal voltage may become larger depending on the generation voltage command, and hence the generation torque also significantly varies. In such a case, it is likely to cause an engine stall because an engine torque may be unstable immediately after the start of the engine. Thus, the generation torque is controlled immediately after the start of the engine, and the generation voltage control is selected when the engine torque becomes stable, and hence a rapid change of a load torque to the engine may be suppressed to prevent the engine stall.

Figure 5:
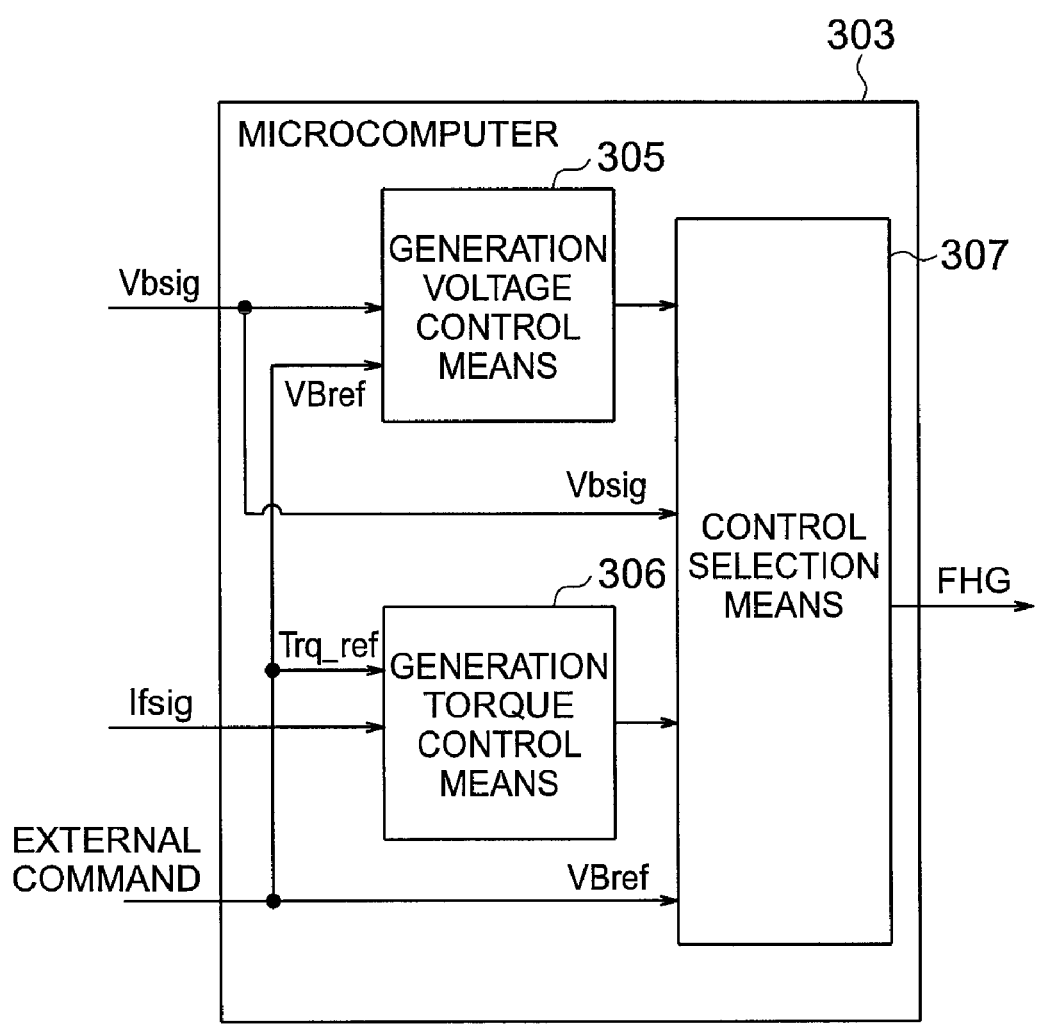
FIG. 5 is a diagram illustrating a microcomputer control structure in Embodiment 1 of the present invention.

As illustrated in FIG. 5, when the generation voltage command VBref and the B-terminal voltage Vbsig are input to the control selection means 307 and a deviation obtained by subtracting the B-terminal voltage Vbsig from the generation voltage command VBref is larger than a predetermined value in a positive direction (for example, equal to or larger than 1[V]), the output of the generation torque control means 306 is selected to control the generation torque. In this case, with respect to the generation torque command Trq_ref for the generation torque control means 306, a torque command provided as an external command or a value obtained by experiment in advance is desirably held as the generation torque command in a ROM included in the microcomputer, so as to control the generation torque. As described above, the control selection means 307 selects the output of the generation voltage control means 305 or the output of the generation torque control means 306 based on the load state of the generator motor 102, and outputs the selected output.

When an input of the generation torque control command or a generation torque command value is input from another control unit through a vehicle network such as a CAN or LIN, for example, when the generation torque command Trq_ref is input as the external command as illustrated in FIG. 4 (external control unit and vehicle network are not shown), the control selection means 307 selects the output of the generation torque control means 306 in order to control the generation torque of the generator motor 102. When the generation voltage command VBref is input, the control selection means 307 selects the output of the generation voltage control means 305 in order to control the generation voltage of the generator motor 102. As described above, the control selection means 307 selects the output of the generation voltage control means 305 or the output of the generation torque control means 306 based on the command from the external control unit, and outputs the selected output.

When the B-terminal voltage becomes equal to or larger than a threshold value so as not to exceed a maximum operating voltage of the generator motor 102 in the case where the control selection means 307 selects the output of the generation torque control means 306, the control selection means 307 switches from the output of the generation torque control means 306 to the output of the generation voltage control means 305 and selects the output thereof. During the generation torque control, the B-terminal voltage is not controlled and the field current is controlled such that the generation torque follows the generation torque command. Therefore, when the generation torque control continues, excessive power may be generated to cause an overvoltage state. Thus, when the B-terminal voltage becomes equal to or larger than the threshold value, the control selection means 307 selects the output of the generation voltage control means 305 to control the generation voltage, and hence the generation of excessive power (overvoltage) may be prevented.

As described above, when the command is input from the external control unit or when the generation load of the generator motor 102 increases, the output of the generation voltage control means 305 is switched to the output of the generation torque control means 306 to control the generation torque of the generator motor 102, and hence a rapid change of the generation torque may be prevented. The output of the generation torque control means 306 is switched to the output of the generation voltage control means 305 based on the command from the external control unit or the B-terminal voltage of the generator motor 102, and hence the generator motor may be prevented from generating excessive power.
Embodiment 2.

Figure 6:
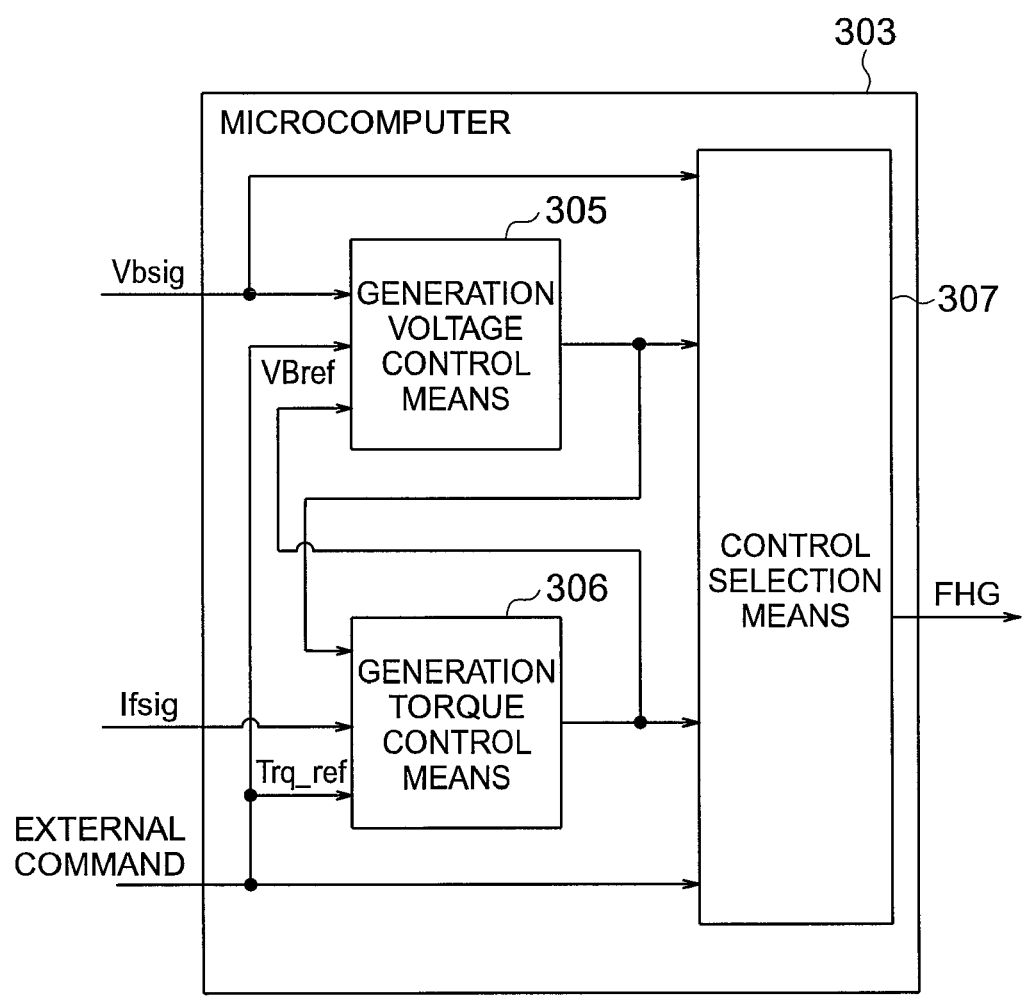
FIG. 6 is a block diagram illustrating internal control of a microcomputer realizing a power converter control apparatus according to Embodiment 2 of the present invention.
Figure 7:
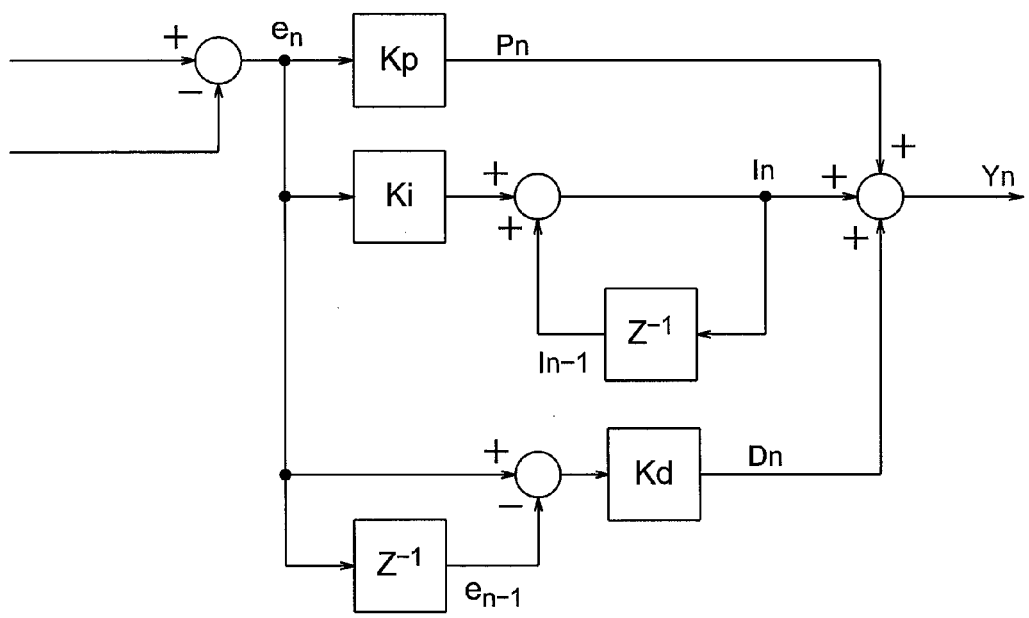
FIG. 7 is a diagram illustrating a structure of a PID controller in Embodiment 2 of the present invention.
Figure 8:
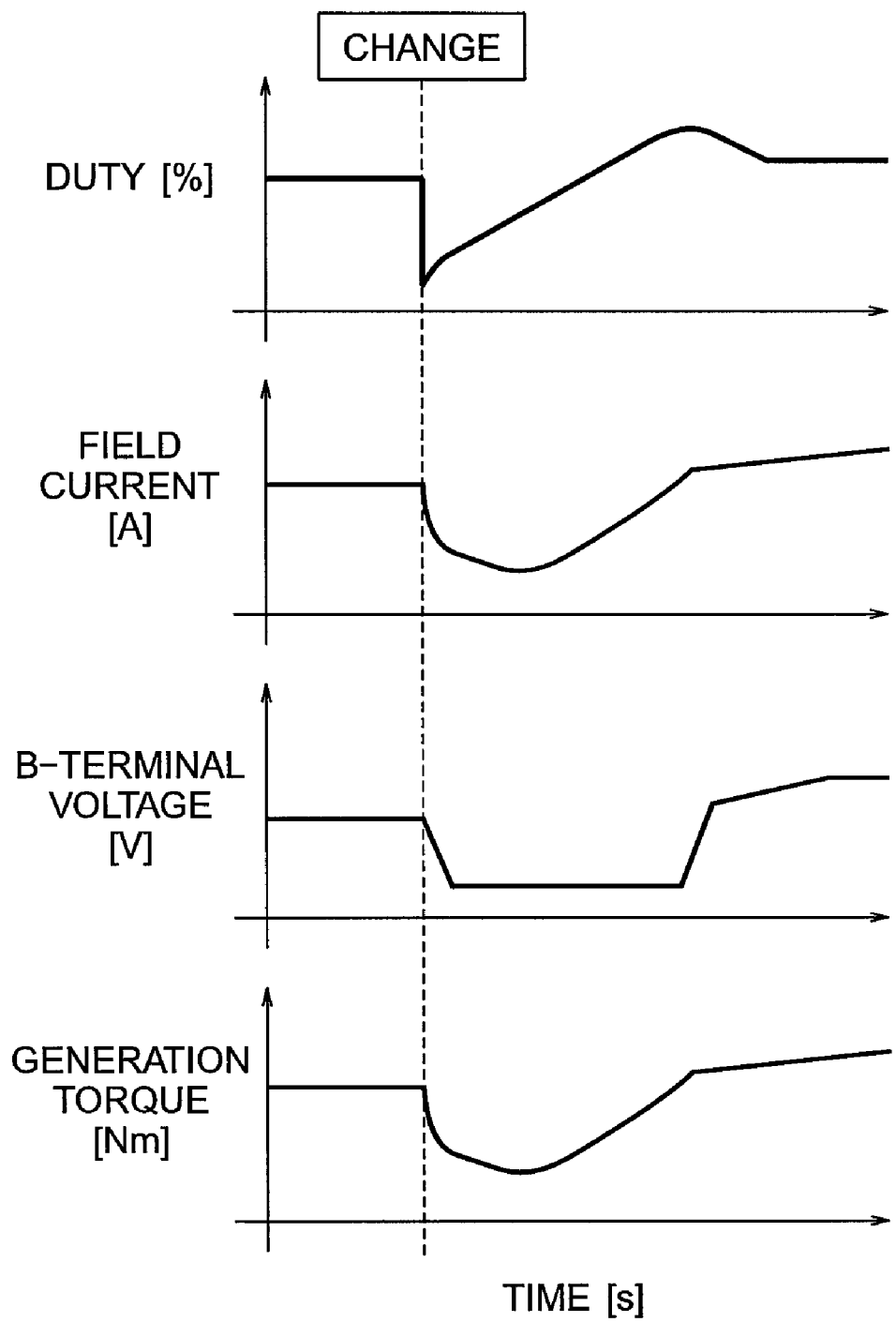
FIG. 8 is a diagram illustrating an operation of the power converter control apparatus according to Embodiment 1 of the present invention.

Next, Embodiment 2 of the present invention is described with reference to the attached drawings. FIG. 6 is a block diagram illustrating internal control of a microcomputer realizing a power converter control apparatus according to Embodiment 2 of the present invention. Voltage feedback control and current feedback control are used as the generation voltage control and the generation torque control. A deviation is calculated based on a command value and a feedback value and a control amount is calculated by PID control having a proportional term, an integral term, and a differential term as illustrated in FIG. 7. In the case where the generation voltage control means 305 or the generation torque control means 306 is selected by the control selection means 307 based on the external command or the load state as in Embodiment 1, as illustrated in FIG. 8, when the control is changed by the control selection, the operation starts from a zero state in which a value of the integral term of the feedback control is an initial value, and hence an on-time (or on-DUTY) which is an output becomes discontinuous. Therefore, the field current changes because of the discontinuity of the on-time (or on-DUTY), and hence the B-terminal voltage or the generation torque varies.

In order to eliminate the discontinuity of the on-time (or on-DUTY), the initial value of the integral term after the change of control is calculated based on a final output of the control selection means 307 before the change of control, to thereby smooth the output of the control selection means 307 before and after the change of control. That is, when the control means is changed from the generation voltage control means 305 to the generation torque control means 306, the output of the control selection means 307 before the change of control is the output of the generation voltage control means 305, and hence the initial value of the integral term of the generation torque control means 306 is calculated based on the output of the generation voltage control means 305. In contrast to this, when the control means is changed from the generation torque control means 306 to the generation voltage control means 305, the output of the control selection means 307 before the change of control is the output of the generation torque control means 306, and hence the initial value of the integral term of the generation voltage control means 305 is calculated based on the output of the generation torque control means 306.

A method of calculating an integral term cumulative value as the initial value of the integral term is described. The generation voltage control or the generation torque control uses a general PID controller as illustrated in FIG. 7. An output of a controller having a proportional term $P_n$, an integral term $I_n$=(integral term current value+integral term cumulative value), and a differential term $D_n$ may be expressed by the following expression.

$$\begin{aligned}\text{Output value } Y_n = & \quad (1)\\ \text{proportional term } P_n &+ \text{integral term } I_n + \text{differential term } D_n =\\ \text{proportional term } P_n &+ \{\text{integral term current value}+\\ \text{integral term cumulative value } I_{n-1}\} &+ \text{differential term } D_n\end{aligned}$$

In the structure of the PID controller illustrated in FIG. 7, a preceding value of the integral term $I_n$ is the integral term cumulative value $I_{n-1}$, and hence the integral term cumulative value $I_{n-1}$ may be expressed by the following expression.

$$\begin{aligned}\text{Integral term cumulative value } I_{n-1} = & \quad (2)\\ \text{preceding value of integral term } I_n =&\\ \text{preceding output value (control before change)} Y_{n-1} -&\\ \{\text{preceding proportional term (control after change)} P_{n-1} +&\\ \text{preceding differential term (control after change)} D_{n-1}\}&\end{aligned}$$

As described in Expression (2), the integral term cumulative value $I_{n-1}$ may be calculated by subtracting, from the output value $Y_{n-1}$ before the change of the control means, the preceding value of the proportional term $P_{n-1}$ and the preceding value of the differential term $D_{n-1}$ after the change of the control means. The preceding proportional term (control after change) and the preceding differential term (control after change) are "0" because those are terms after the change of the control, and hence Expression (2) may be expressed as the following expression.

$$\text{Integral term cumulative value } I_{n-1}=\text{preceding output value (control before change) } Y_{n-1} \quad (3)$$

When an initial value of the integral term cumulative value $I_{n-1}$ in the case where the control means is changed is set as the integral term cumulative value $I_{n-1}$ calculated using Expression (3), the discontinuity of the output of the controller may be suppressed.

With respect to the calculation of the initial value, this embodiment does not describe conversion for unit matching between the preceding output value and the initial value of the integral term. However, when the unit system of the output value is different from the unit system of the integral term, the initial value of the integral term is calculated after the conversion. The structure of the controller may be a structure having the proportional term and the integral term. The calculation method is substantially the same, and hence the initial value of the integral term is desirably calculated based on the preceding output value of the control selection means 307 and the preceding proportional term selected by the control selection means 307. In this embodiment, the initial value of the integral term is desirably calculated based on the preceding output value, the preceding proportional term, and the preceding differential term, but an integral term I(n) before the change of control may be used as the initial value. This embodiment describes the generation voltage control and the generation torque control, but other control systems may be employed.

Figure 9:
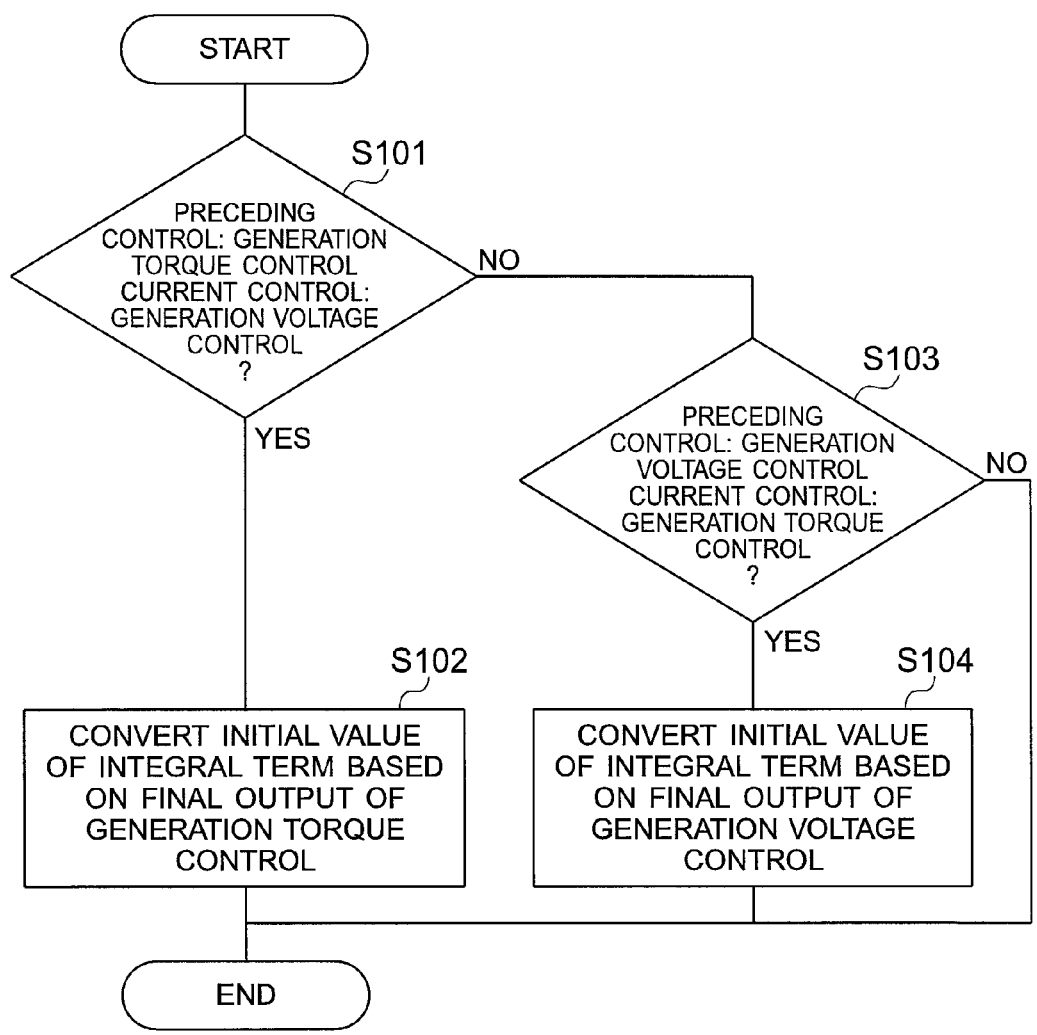
FIG. 9 is a flowchart illustrating an operation of a control selection means in Embodiment 2 of the present invention.

FIG. 9 is a flowchart illustrating the operation of the control selection means 307 in Embodiment 2. In Step S101, whether or not the preceding control is the generation torque control and the current control is the generation voltage control is determined. When the preceding control is the generation torque control and the current control is the generation voltage control, the operation goes to Step S102. When conditions in which the preceding control is the generation torque control and the current control is the generation voltage control are not satisfied together, the operation goes to Step S103. In Step S102, the initial value of the integral term of the generation voltage control is calculated based on the generation torque control output because the preceding control is the generation torque control and the current control is the generation voltage control, and then the operation goes to END. In Step S103, whether or not the preceding control is the generation voltage control and the current control is the generation torque control is determined. When the preceding control is the generation voltage control and the current control is the generation torque control, the operation goes to Step S104. When conditions in which the preceding control is the generation voltage control and the current control is the generation torque control are not satisfied together, that is, when the control continues, the operation goes to END. In Step S104, the initial value of the integral term of the generation torque control is calculated based on the generation voltage control output because the preceding control is the generation voltage control and the current control is the generation torque control, and then the operation goes to END.

Figure 10:
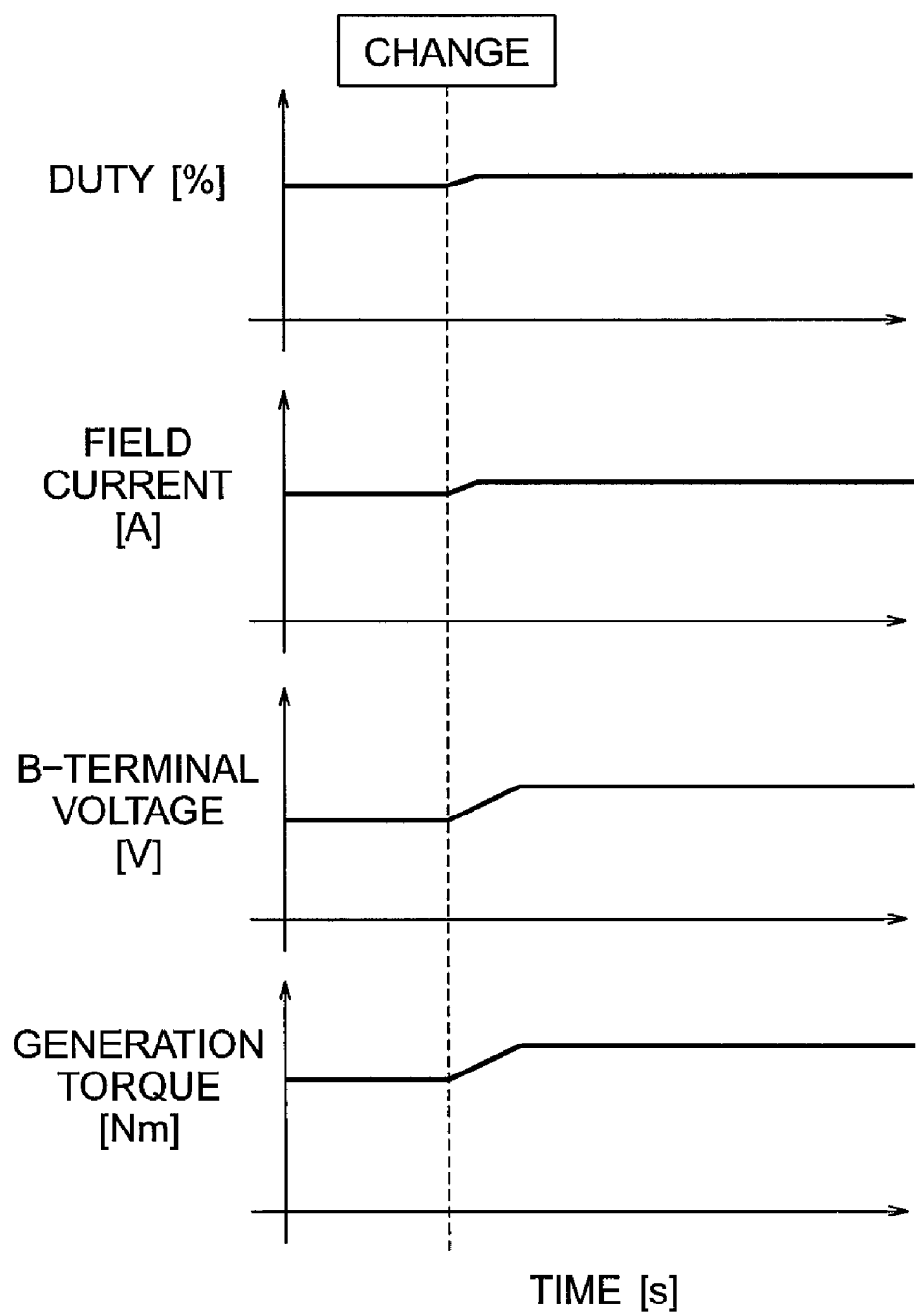
FIG. 10 is a diagram illustrating an operation of a power converter control apparatus according to Embodiment 2 of the present invention.

When the initial value of the feedback control at the change of control is substituted as described above, as illustrated in FIG. 10, the discontinuity of the output of the control selection means 307 before and after the change of control may be suppressed, and hence the variation in generation voltage or generation torque at the change of control may be suppressed.

Embodiment 3.

Figure 11:
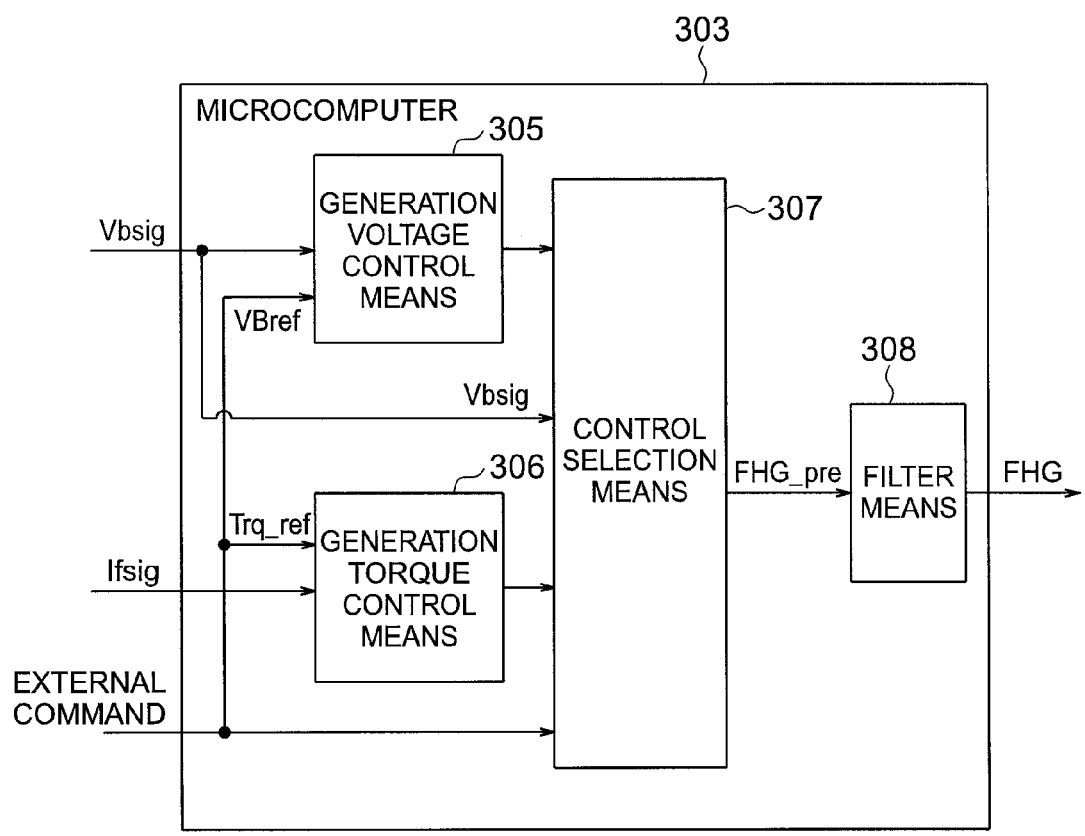
FIG. 11 is a diagram illustrating a microcomputer control structure in Embodiment 3 of the present invention.

Next, Embodiment 3 of the present invention is described with reference to the attached drawings. FIG. 11 is a block diagram illustrating internal control of a microcomputer realizing a power converter control apparatus according to Embodiment 3 of the present invention. In general, the feedback control such as the generation voltage control or the generation torque control is performed based on the command value and the feedback value. Therefore, when the control is changed by the selection of control as illustrated in FIG. 11, the feed back control is operated from the initial value, and hence the discontinuity of the output occurs as illustrated in FIG. 8. Thus, the discontinuity of the on-time affects the field current, the B-terminal voltage, and the generation torque.

In order to eliminate the discontinuity, as illustrated in FIG. 11, a filter means 308 is provided on the output side of the control selection means 307 to smooth the output, and hence the discontinuity is eliminated. At the change of control, the on-time (or on-DUTY) is initialized and thus the output is rapidly changed. However, the output is smoothed by the filter means 308 and thus suppressed from being rapidly changed.

When the control output of the generation voltage control means 305 is the on-time (or on-DUTY) and the control output of the generation torque control means 306 is the applied voltage, the generation torque control output is converted into the on-time (or on-DUTY) and input to the control selection means 307. The conversion from the applied voltage (Vf) to the on-time (Ton) is the same as Expression (2).

With respect to the on-time which is the output of the generation voltage control means 305 and the on-time which is the output of the generation torque control means 306, which are input to the control selection means 307, the rapid change of the on-time at the selection of control is suppressed by the filter means 308, and hence variations in field current, B-terminal voltage, and generation torque are suppressed.

As described above, in Embodiment 3, the filter means 308 is provided on the output side of the control selection means 307, and hence the discontinuity of the output of the control selection means 307 which is caused at the change of control may be suppressed. Therefore, the rapid change of the field current may be prevented and the variation in generation torque may be suppressed.

What is claimed is:

1. A power converter control apparatus connected for use to a multiphase alternating current generator motor including an armature winding and a field winding, comprising:
    a power conversion unit; and
    a control device for controlling on/off of switching elements of the power conversion unit, wherein:
    the power conversion unit includes:
        a bridge circuit including a switching element for a positive side arm and a switching element for a negative side arm, for controlling energization of the armature winding; and
        a field circuit for controlling energization of the field winding using a field switching element;
    the control device includes:
        B-terminal voltage detection means for detecting a B-terminal voltage generated between a reference potential and a B-terminal which is a power input and output terminal of the multiphase alternating current generator motor;
        field current detection means for detecting a field current flowing through the field winding;
        generation voltage control means for controlling the field current so that the B-terminal voltage in the multiphase alternating current generator motor becomes equal to a generation voltage command;
        generation torque control means for controlling the field current so that a generation torque in the multiphase alternating current generator motor becomes equal to a generation torque command; and
        control selection means for choosing one of the generation voltage control means and the generation torque control means during generation of power; and
    the control selection means selects the one of the generation voltage control means and the generation torque control means based on one of a command from an outside and a load of the multiphase alternating current generator motor.

2. A power converter control apparatus according to claim 1, wherein
    the control selection means selects the one of the generation voltage control means and the generation torque control means when one of a command for releasing driving of the generator motor, a generation voltage control command, and the generation torque command is input.

3. A power converter control apparatus according to claim 1, wherein
    the control selection means selects the one of the generation voltage control means and the generation torque control means based on a deviation between the B-terminal voltage and the generation voltage command.

4. A power converter control apparatus according to claim 1, wherein, in selecting the one of the generation voltage control means and the generation torque control means during the generation of power, the control selection means calculates an initial value of a control output after selection based on a final control output before selection.

5. A power converter control apparatus according to claim 1, further comprising filter means for filtering an output of the one of the generation voltage control means and the generation torque control means which is selected by the control selection means.

* * * * *